United States Patent
Wu et al.

(10) Patent No.: US 9,812,706 B2
(45) Date of Patent: Nov. 7, 2017

(54) PROTECTED ACTIVE METAL ELECTRODE AND DEVICE WITH THE ELECTRODE

(71) Applicant: Industrial Technology Research Institute, Hsinchu (TW)

(72) Inventors: Jin-Bao Wu, Hsinchu (TW); Li-Duan Tsai, Hsinchu (TW); Jia-Jen Chang, Yunlin County (TW); Ming-Sheng Leu, Hsinchu County (TW); Jenn-Yeu Hwang, Keelung (TW); Chun-Lung Li, Taoyuan County (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 654 days.

(21) Appl. No.: 14/140,471

(22) Filed: Dec. 25, 2013

(65) Prior Publication Data
US 2014/0186716 A1 Jul. 3, 2014

(30) Foreign Application Priority Data
Dec. 28, 2012 (TW) .............................. 101151089 A (51) Int. Cl.
*H01M 4/36* (2006.01)
*H01M 4/13* (2010.01)
(Continued)

(52) U.S. Cl.
CPC .............. *H01M 4/366* (2013.01); *H01M 4/13* (2013.01); *H01M 4/38* (2013.01); *H01M 4/382* (2013.01);
(Continued)

(58) Field of Classification Search
CPC ............ H01M 4/36; H01M 4/13; H01M 4/38; H01M 4/382; H01M 4/483; H01M 4/581;
(Continued)

(56) References Cited

U.S. PATENT DOCUMENTS

| 6,025,094 A | 2/2000 | Visco et al. |
| 6,733,924 B1 | 5/2004 | Skotheim et al. |

(Continued)

FOREIGN PATENT DOCUMENTS

| CN | 1726608 | 1/2006 |
| CN | 1938895 | 3/2007 |

(Continued)

OTHER PUBLICATIONS

"Office Action of China Counterpart Application", issued on Sep. 18, 2015, p. 1-p. 7, in which the listed references were cited.

(Continued)

*Primary Examiner* — Helen O Conley
(74) *Attorney, Agent, or Firm* — Birch, Stewart, Kolasch & Birch, LLP (57) ABSTRACT

A protected active metal electrode and a device with the electrode are provided. The protected active metal electrode includes an active metal substrate and a protection layer on a surface of the active metal substrate. The protection layer at least includes a metal thin film covering the surface of the active metal substrate and an electrically-conductive thin film covering a surface of the metal thin film. A material of the metal thin film is Ti, V, Cr, Zr, Nb, Mo, Hf, Ta, or W. A material of the electrically-conductive thin film is selected from nitride of a metal in the metal thin film, carbide of a metal in the metal thin film, a diamond-like carbon (DLC), and a combination thereof.

21 Claims, 5 Drawing Sheets (51) Int. Cl.
- *H01M 4/38* (2006.01)
- *H01M 4/48* (2010.01)
- *H01M 4/58* (2010.01)
- *H01M 4/62* (2006.01)
- *H01M 10/0525* (2010.01)
- *B82Y 30/00* (2011.01)
- *H01M 4/02* (2006.01)

(52) U.S. Cl.
CPC ............ *H01M 4/483* (2013.01); *H01M 4/581* (2013.01); *H01M 4/624* (2013.01); *H01M 4/625* (2013.01); *H01M 10/0525* (2013.01); *B82Y 30/00* (2013.01); *H01M 2004/021* (2013.01); *Y10S 977/742* (2013.01); *Y10S 977/948* (2013.01)

(58) Field of Classification Search
CPC ... H01M 4/624; H01M 4/626; H01M 10/0525
See application file for complete search history.

(56) References Cited

U.S. PATENT DOCUMENTS

| | | | |
|---|---|---|---|
| 6,764,791 | B2 | 7/2004 | Tamura et al. |
| 6,936,381 | B2 | 8/2005 | Skotheim et al. |
| 6,982,132 | B1 | 1/2006 | Goldner et al. |
| 7,303,839 | B2 | 12/2007 | Lee et al. |
| 7,534,530 | B2 | 5/2009 | Guterman et al. |
| 7,648,537 | B2 | 1/2010 | Harada et al. |
| 8,053,025 | B2 | 11/2011 | Lin et al. |
| 8,080,337 | B2 * | 12/2011 | Higuchi ............... C23C 14/3464 429/218.1 |
| 2003/0129497 | A1 | 7/2003 | Yamamoto et al. |
| 2004/0058232 | A1 | 3/2004 | Kim et al. |
| 2004/0253510 | A1 | 12/2004 | Jonghe et al. |
| 2005/0003277 | A1 | 1/2005 | Lee et al. |
| 2007/0221265 | A1 | 9/2007 | Affinito et al. |
| 2008/0057387 | A1 | 3/2008 | Visco et al. |
| 2010/0261056 | A1 * | 10/2010 | Uchida ................. H01M 4/661 429/209 |
| 2010/0330422 | A1 | 12/2010 | Kim et al. |
| 2012/0040273 | A1 | 2/2012 | Heo et al. |

FOREIGN PATENT DOCUMENTS

| | | |
|---|---|---|
| CN | 101346835 | 1/2009 |
| CN | 101702444 | 5/2010 |
| CN | 102324586 | 1/2012 |
| TW | 200711204 | 3/2007 |
| TW | I372481 | 9/2012 |

OTHER PUBLICATIONS

"Notice of Allowance of Taiwan Counterpart Application", issued on Jan. 20, 2015, p. 1-p. 4, in which the listed references were cited.

Lu et al., "Electrochemical characterization of diamond like carbon thin films," Diamond and Related Materials 17, Apr. 8, 2008, pp. 1871-1876.

Shim et al., "DLC Film Coating on a Lithium Metal As an Anode of Lithium Secondary Batteries," Solid State phenomena 124-126, Jun. 15, 2007, pp. 919-922.

Arie et al., "Electrochemical characteristics of lithium metal anodes with diamond like carbon film coating layer," Diamond and Related Materials 20, Jan. 26, 2011, pp. 403-408.

Dudney, "Addition of a thin-film inorganic solid electrolyte (Lipon) as a protective film in lithium batteries with a liquid electrolyte," Journal of Power Sources 89, Feb. 10, 2000, pp. 176-179.

Lee et al., "Fabrication of Lithium Nitride Film as a Protective Layer for the Li—S Secondary Battery System," 203th ECS meeting, Apr. 2003, pp. 1.

* cited by examiner

PROTECTED ACTIVE METAL ELECTRODE AND DEVICE WITH THE ELECTRODE

CROSS-REFERENCE TO RELATED APPLICATION

This application claims the priority benefit of Taiwan application serial no. 101151089, filed on Dec. 28, 2012. The entirety of the above-mentioned patent application is hereby incorporated by reference herein and made a part of this specification.

TECHNICAL FIELD

The disclosure relates to a protected active metal electrode and a device with the electrode.

BACKGROUND

Increasing storage capacity is currently one of the priorities of research and development of the secondary battery. Among secondary batteries, lithium ion battery that use materials capable of inserting/extracting lithium ions as positive electrode and negative electrode respectively shows the highest energy density. However, due to the limited capacities of the cathode and anode materials, the highest energy density that may be achieved by lithium ion battery is limited by above materials and may not be increased further. Therefore, the development of an electrode material with high capacity is urgently needed.

Among the plurality of materials, active metals such as lithium, sodium, magnesium, calcium, and aluminum used as the active material of battery have the advantages of lightweight and high capacity. In particular, lithium metal and materials that capable of alloying with lithium (such as silicon, tin, and aluminum) may all achieve the effect of high capacity. However, the volumes of materials that capable of alloying with lithium inevitably expand when reacting with lithium, which causes the active material to fragment and peel when charged and discharged repeatedly, and consequently it causes poor cycle life thereof. Among active metals, for instance, although lithium metal has a capacity reaching 3862 mAh/g, lithium metal is very active. Lithium metal is not only sensitive to moisture and air but also capable of reacting with species in the electrolyte solution during charge and discharge process, which leads to the loss of activity of lithium metal and the reduction in the capacity provided by lithium metal. Other active metals such as sodium, magnesium, calcium, and aluminum may also be corroded by outside reactive materials, which affect the capacity thereof. On the other hand, for instance, dendritic lithium deposits may be produced on the surface of the lithium metal after being charged and discharged repeatedly. A hidden safety concern of the lithium deposit with the particular surface is that the separator may be punctured and cause a short circuit. Therefore, if an electrically-conductive protection layer is be coated on the surface of the active metal electrode, then the capacity of the device may be effectively increased and the cycle life thereof may also be increased.

Currently, the protection layer used as the surface of the active metal electrode may be a single-layer structure or a multi-layer structure. If the surface protection layer uses a single-layer structure design, then the deterioration of active electrode may not been effectively suppressed during the operation of device. However, if the surface protection layer uses a multi-layer design, then problems of compatibility and electrical conductivity occur. In recent technology, if the multi-layer structure includes ion-conducting ceramic, ion-conducting salt, organic compound, polymer and such, then the problem of poor electrical conductivity may readily occur. If the multi-layer structure includes a metal that may conduct an alloy reaction with ions, then the volume of the multi-layer structure may inevitably expand when alloyed with the ions, therefore causing each electrode layer to be unable to maintain a stable compatible structure, which in turn affects service life. Fragmentation of the protection layer material may even occur.

SUMMARY

The disclosure provides a protected active metal electrode. The protected active metal electrode includes an active metal substrate and a protection layer on a surface of the active metal substrate. The protection layer at least includes a metal thin film covering the surface of the active metal substrate and an electrically-conductive thin film covering a surface of the metal thin film. The material of the metal thin film is Ti, V, Cr, Zr, Nb, Mo, Hf, Ta, or W. The material of the electrically-conductive thin film is selected from one of nitride of a metal in the metal thin film, carbide of a metal in the metal thin film, a diamond-like carbon (DLC), and a combination thereof.

The disclosure further provides a protected lithium metal electrode. The protected lithium metal electrode includes a lithium metal substrate and a protection layer located on a surface of the lithium metal substrate. The protection layer at least includes a metal thin film covering the surface of the lithium metal substrate and an electrically-conductive thin film covering a surface of the metal thin film. The material of the metal thin film is Ti, V, Cr, Zr, Nb, Mo, Hf, Ta, or W. The material of the electrically-conductive thin film is selected from one of nitride of a metal in the metal thin film, carbide of a metal in the metal thin film, DLC, and a combination thereof.

The disclosure further provides a device with a protected active metal electrode. The device includes a positive electrode, an active metal negative electrode, and an electrolyte in contact with the positive electrode and the active metal negative electrode to provide active metal ions for conduction. The active metal negative electrode is the foregoing protected active metal electrode.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
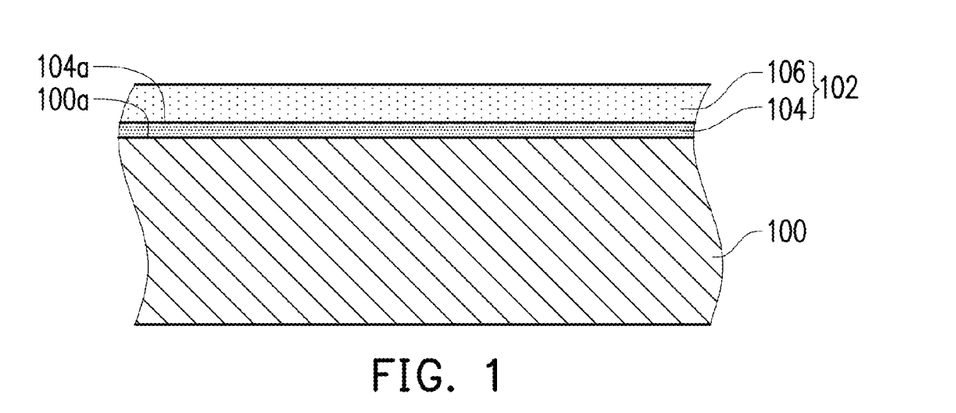
FIG. 1 is a schematic diagram of a protected active metal electrode according to the first exemplary embodiment of the disclosure.

FIG. 1 is a cross-sectional schematic diagram of a protected active metal electrode according to the first exemplary embodiment of the disclosure.

Referring to FIG. 1, the protected active metal electrode of the present embodiment includes a metal substrate 100 and a protection layer 102 located on a surface 100a thereof. The active metal substrate 100 may include a metal substrate selected from one of lithium, sodium, magnesium, calcium, aluminum, and a combination thereof. In terms of higher capacity and lighter weight, lithium may be selected for use. The protection layer 102 at least includes a metal thin film 104 covering the surface 100a of the active metal substrate 100 and an electrically-conductive thin film 106 covering a surface 104a of the metal thin film 104. The thickness of the metal thin film 104 is, for instance, between 10 nm and 100 nm. The thickness of the electrically-conductive thin film 106 is, for instance, between 10 nm and 1000 nm, preferably between 50 nm and 1000 nm. The metal thin film 104 is a metal that does not react with the active metal substrate 100, and may be Ti, V, Cr, Zr, Nb, Mo, Hf, Ta, or W. In terms of the characteristics of high stability, good erosion resistance, and low impedance, titanium, chromium, niobium, or tantalum may be selected for use. On the other hand, since both metal nitride and metal carbide have good electrical conduction ability, the material of the electrically-conductive thin film 106 is selected from one of nitride of the metal in the metal thin film 104, carbide of the metal in the metal thin film 104, and a combination thereof. In the present embodiment, the resistivity of the electrically-conductive thin film 106 is, for instance, between $10^{-5}$ Ωcm and $10^{2}$ Ωcm, preferably between $10^{-5}$ Ωcm and $10^{0}$ Ωcm, and more preferably between $10^{-5}$ Ωcm and $10^{-2}$ Ωcm. If the material of the metal thin film 104 is titanium, chromium, niobium, or tantalum, then the material of the electrically-conductive thin film 106 may be $TiN_x$, $CrN_x$, $TaN_x$, or $NbN_x$; or $TiC_x$, $CrC_x$, $TaC_x$, or $NbC_x$, wherein x=0.01-1.0; preferably, x=0.1-1.0; more preferably, x=0.3-1.0. Moreover, if the active metal substrate 100 is lithium, then when the electrically-conductive thin film 106 is metal nitride, the thickness of the metal thin film 104 may be appropriately adjusted to ensure that the active metal substrate 100 is not affected by nitrogen.

In the first embodiment, the electrically-conductive thin film 106 may also be a DLC thin film having, for instance, a tetrahedral amorphous carbon (ta-C) structure, wherein the $sp^3$ content>40%. Since the active metal substrate 100 is not affected by the DLC thin film, if the active metal substrate 100 is lithium, then the thickness of the metal thin film 104 has a greater margin. Moreover, in the present embodiment, a thin film deposition technique such as cathodic arc may be used to grow a thin film in high vacuum having the characteristics of low resistivity and high adhesion.

Figure 2:
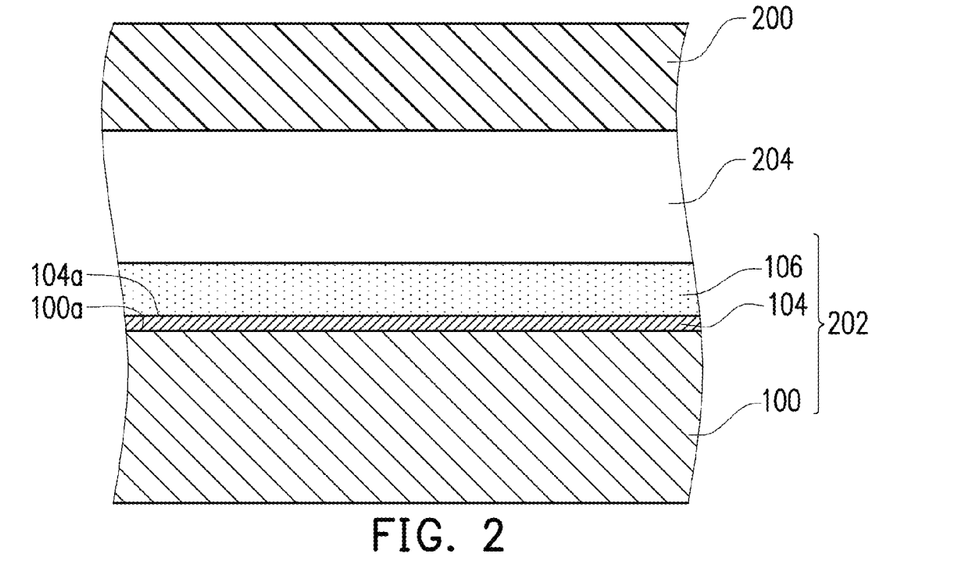
FIG. 2 is a cross-sectional schematic diagram of a device with a protected active metal electrode according to the second exemplary embodiment of the disclosure.

FIG. 2 is a cross-sectional schematic diagram of a device with a protected active metal electrode according to the second exemplary embodiment of the disclosure.

Referring to FIG. 2, the device of the present embodiment includes a positive electrode 200, an active metal negative electrode 202, and an electrolyte 204 in contact with the positive electrode 200 and the active metal negative electrode 202 to provide active metal ions for conduction. The active metal negative electrode 202 is, for instance, the protected active metal electrode of FIG. 1, wherein the protected active metal electrode includes the active metal substrate 100, the metal thin film 104 on the surface 100a thereof, and the electrically-conductive thin film 106 on the surface 104a of the metal thin film 104. On the other hand, the positive electrode 200 is not particularly limited thereto but may be a material selected from the group consisting of a sulfur-containing material, metal oxide, a carbon material, and a combination thereof. The sulfur-containing material is, for instance, a material selected from the group consisting of sulfur, metal sulfide, organic sulfur, and a combination thereof. The metal oxide is, for instance, lithium-containing metal oxide or lithium-free metal oxide. The lithium-containing oxide is, for instance, an oxide selected from the group consisting of lithium cobalt oxide, lithium nickel oxide, lithium manganese oxide, lithium nickel manganese oxide, lithium nickel cobalt oxide, lithium cobalt manganese oxide, lithium nickel cobalt manganese oxide, lithium iron oxide, lithium cobalt phosphorous oxide, lithium nickel phosphorous oxide, lithium iron phosphorous oxide, lithium manganese phosphorous oxide, lithium cobalt manganese phosphorous oxide, lithium nickel cobalt phosphorous oxide, lithium iron cobalt phosphorous oxide, lithium iron nickel phosphorous oxide, lithium iron manganese phosphorous oxide, lithium iron silicon oxide, lithium iron boron oxide, lithium titanium oxide, lithium cobalt titanium oxide, lithium manganese titanium oxide, lithium iron titanium oxide, lithium titanium phosphorous oxide, lithium vanadium oxide, lithium vanadium phosphorous oxide, and a combination thereof. The lithium-free oxide is, for instance, an oxide selected from the group consisting of vanadium oxide, manganese oxide, tungsten oxide, titanium oxide, chromium oxide, iron oxide, cobalt oxide, nickel oxide, niobium oxide, molybdenum oxide, tin oxide, sodium vanadium oxide, sodium manganese oxide, sodium titanium oxide, sodium chromium oxide, sodium iron oxide, sodium cobalt oxide, sodium nickel manganese oxide, sodium nickel cobalt oxide, sodium cobalt manganese oxide, sodium nickel cobalt manganese oxide, sodium cobalt phosphorous oxide, sodium nickel phosphorous oxide, sodium iron phosphorous oxide, sodium manganese phosphorous oxide, sodium iron manganese phosphorous oxide, sodium vanadium phosphorous oxide, sodium titanium phosphorous oxide, and a combination thereof. The carbon material is, for instance, a material selected from the group consisting of activated carbon, carbon black, graphite, carbon fiber, carbon nanotube, mesoporous carbon, graphene, and a combination thereof. The electrolyte 204 is not particularly limited thereto but may be a solid electrolyte, molten salt, an ionic liquid, a gel electrolyte, or an electrolyte solution. The electrolyte includes active metal ions selected from lithium ions, sodium ions, magnesium ions, calcium ions, aluminum ions, and a combination thereof. For example, the electrolyte 204 may be a lithium ion-containing solid electrolyte, lithium ion-containing molten salt, a lithium ion-containing ionic liquid, a lithium ion-containing gel electrolyte, a lithium ion-containing electrolyte solution, a sodium ion-containing solid electrolyte, sodium ion-containing molten salt, a sodium ion-containing ionic liquid, a sodium ion-containing gel electrolyte, a sodium ion-containing electrolyte solution, a magnesium ion-containing solid electrolyte, magnesium ion-containing molten salt, a magnesium ion-containing ionic liquid, a magnesium ion-containing gel electrolyte, a magnesium ion-containing electrolyte solution, a calcium ion-containing solid electrolyte, calcium ion-containing molten salt, a calcium ion-containing ionic liquid, a calcium ion-containing gel electrolyte, a calcium ion-containing electrolyte solution, an aluminum ion-containing solid electrolyte, aluminum ion-containing molten salt, an aluminum ion-containing ionic liquid, an aluminum ion-containing gel electrolyte, or an aluminum ion-containing electrolyte solution.

Figure 3:
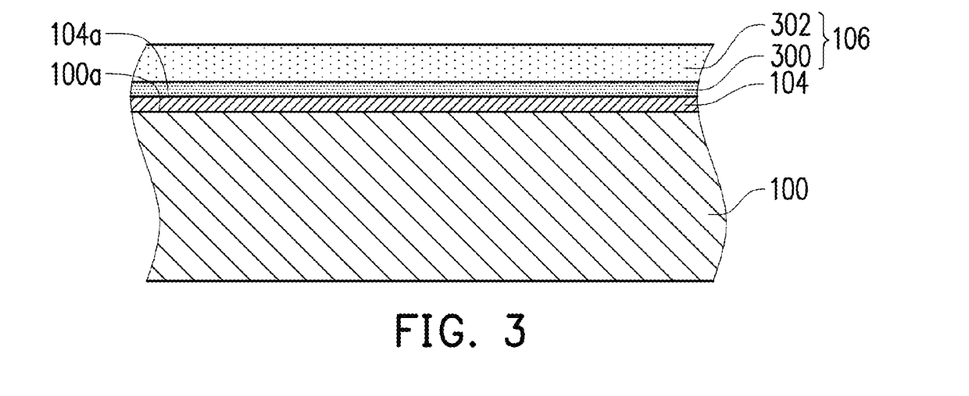
FIG. 3 is a schematic diagram of a protected active metal electrode according to the third exemplary embodiment of the disclosure.

FIG. 3 is a cross-sectional schematic diagram of a protected active metal electrode according to the third exemplary embodiment of the disclosure, wherein the same reference numerals in the first exemplary embodiment are used as the same elements.

In FIG. 3, other than the active metal substrate 100 and metal thin film 104 shown in FIG. 1, the electrically-conductive thin film 106 on the surface 104a of the metal thin film 104 consists of a first conductive layer 300 and a second conductive layer 302. The second conductive layer 302 is a DLC thin film, and its thickness is, for example, 10-1000 nm. The material of the first conductive layer 300 is, for instance, $TiN_x$, $CrN_x$, $NbN_x$, $TaN_x$, $TiC_x$, $CrC_x$, $TaC_x$, or $NbC_x$, $0.01<x<1.0$. Moreover, since the second conductive layer 302 is DLC thin film, it is preferably to use carbide of the metal in the metal thin film 104 as the material of the first conductive layer 300.

Figure 4:
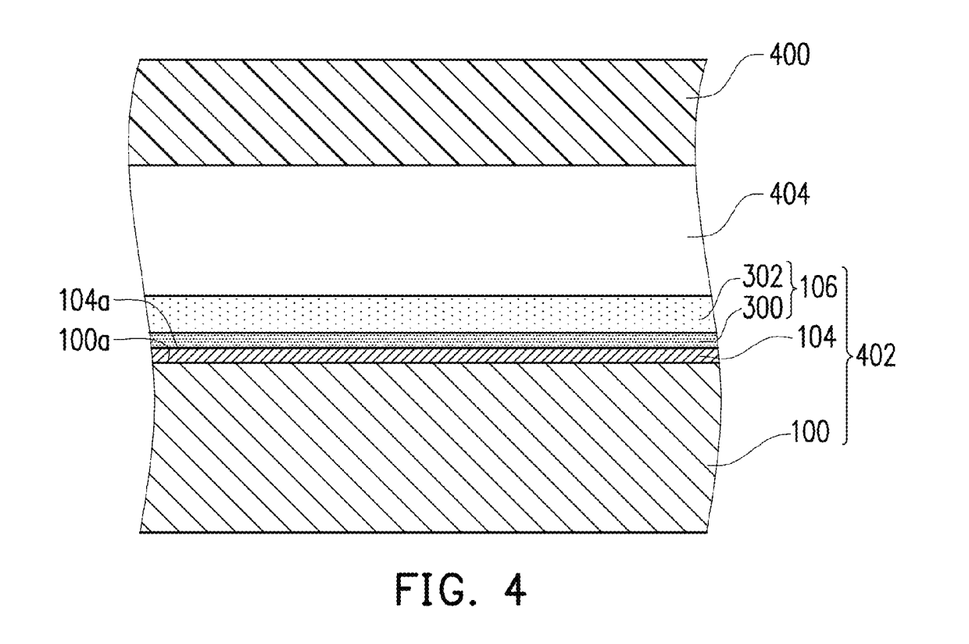
FIG. 4 is a cross-sectional schematic diagram of a device with a protected active metal electrode according to the fourth exemplary embodiment of the disclosure.

FIG. 4 is a cross-sectional schematic diagram of a device with a protected active metal electrode according to the fourth exemplary embodiment of the disclosure.

Referring to FIG. 4, the device of the present embodiment includes a positive electrode 400, an active metal negative electrode 402, and an electrolyte 404 in contact with the positive electrode 400 and the active metal negative electrode 402 to provide active metal ions for conduction. The active metal negative electrode 402 is, for instance, the protected active metal electrode of FIG. 3, wherein the protected active metal electrode includes an active metal substrate 100, a stacked metal thin film 104, and the electrically-conductive thin film 106 consisting of the first conductive layer 300 and the second conductive layer 302. The second conductive layer 302 is a DLC thin film, and its thickness is, for example, 10-1000 nm. On the other hand, the positive electrode 400 is not particularly limited thereto but may be a material selected from the group consisting of a sulfur-containing material, metal oxide, a carbon material, and a combination thereof. The sulfur-containing material is, for instance, a material selected from the group consisting of sulfur, metal sulfide, organic sulfur, and a combination thereof. The metal oxide is, for instance, lithium-containing metal oxide or lithium-free metal oxide. The lithium-containing oxide is, for instance, an oxide selected from the group consisting of lithium cobalt oxide, lithium nickel oxide, lithium manganese oxide, lithium nickel manganese oxide, lithium nickel cobalt oxide, lithium cobalt manganese oxide, lithium nickel cobalt manganese oxide, lithium iron oxide, lithium cobalt phosphorous oxide, lithium nickel phosphorous oxide, lithium iron phosphorous oxide, lithium manganese phosphorous oxide, lithium cobalt manganese phosphorous oxide, lithium nickel cobalt phosphorous oxide, lithium iron cobalt phosphorous oxide, lithium iron nickel phosphorous oxide, lithium iron manganese phosphorous oxide, lithium iron silicon oxide, lithium iron boron oxide, lithium titanium oxide, lithium cobalt titanium oxide, lithium manganese titanium oxide, lithium iron titanium oxide, lithium titanium phosphorous oxide, lithium vanadium oxide, lithium vanadium phosphorous oxide, and a combination thereof. The lithium-free oxide is, for instance, an oxide selected from the group consisting of vanadium oxide, manganese oxide, tungsten oxide, titanium oxide, chromium oxide, iron oxide, cobalt oxide, nickel oxide, niobium oxide, molybdenum oxide, tin oxide, sodium vanadium oxide, sodium manganese oxide, sodium titanium oxide, sodium chromium oxide, sodium iron oxide, sodium cobalt oxide, sodium nickel manganese oxide, sodium nickel cobalt oxide, sodium cobalt manganese oxide, sodium nickel cobalt manganese oxide, sodium cobalt phosphorous oxide, sodium nickel phosphorous oxide, sodium iron phosphorous oxide, sodium manganese phosphorous oxide, sodium iron manganese phosphorous oxide, sodium vanadium phosphorous oxide, sodium titanium phosphorous oxide, and a combination thereof. The carbon material is, for instance, a material selected from the group consisting of activated carbon, carbon black, graphite, carbon fiber, carbon nanotube, mesoporous carbon, graphene, and a combination thereof. The electrolyte 404 is not particularly limited thereto but may be a solid electrolyte, molten salt, an ionic liquid, a gel electrolyte, or an electrolyte solution. The electrolyte includes active metal ions selected from lithium ions, sodium ions, magnesium ions, calcium ions, aluminum ions, and a combination thereof. For example, the electrolyte 404 may be a lithium ion-containing solid electrolyte, lithium ion-containing molten salt, a lithium ion-containing ionic liquid, a lithium ion-containing gel electrolyte, a lithium ion-containing electrolyte solution, a sodium ion-containing solid electrolyte, sodium ion-containing molten salt, a sodium ion-containing ionic liquid, a sodium ion-containing gel electrolyte, a sodium ion-containing electrolyte solution, a magnesium ion-containing solid electrolyte, magnesium ion-containing molten salt, a magnesium ion-containing ionic liquid, a magnesium ion-containing gel electrolyte, a magnesium ion-containing electrolyte solution, a calcium ion-containing solid electrolyte, calcium ion-containing molten salt, a calcium ion-containing ionic liquid, a calcium ion-containing gel electrolyte, a calcium ion-containing electrolyte solution, an aluminum ion-containing solid electrolyte, aluminum ion-containing molten salt, an aluminum ion-containing ionic liquid, an aluminum ion-containing gel electrolyte, or an aluminum ion-containing electrolyte solution.

Experiments are listed below to confirm the efficacy of the disclosure.

Fabrication Example 1: Fabrication of Lithium Metal Electrode Consisting of Metal Lithium/Titanium/Titanium Carbide/DLC Thin Film Coating process: the DC arc ion film plating is composed of a negatively charged cathodic target and a positively charged anode arc runner, wherein a low voltage (about 20V) and a current ranging from tens of amperes to about 100 amperes are used. The plasma generated by the cathodic arc spot is quickly diffused into the vacuum chamber to conduct film plating. The cathodic target includes a pure graphite carbon target and a titanium metal target to fabricate a DLC thin film and a titanium carbide thin film, wherein the processing temperature for plating thin film is about 50° C. to 100° C., the processing pressure is about $10^{-4}$ Pa to 1 Pa, and the feed gas is argon or methane gas.

The coating process is used to plate a titanium metal thin film, a titanium carbide layer, and a DLC thin film structure on the lithium metal substrate in order. On the other hand, the thickness of the DLC thin film in the structure is about 530 nm, the thickness of the titanium carbide thin film is between 50 nm and 180 nm, and the thickness of the metal titanium thin film is between 10 nm and 95 nm.

The resistivity of the protection layer (titanium/titanium carbide/DLC thin film) is measured to be $8\times10^{-4}$ Ωcm. Moreover, the composition structure is analyzed by identifying the bonding of the carbon thereof with XPS. It is known from the analysis of the XPS energy spectrum that, the binding energy positions of the particular DLC thin film with C—O, $sp^3$, and $sp^2$ bonds are each independently 286.4, 284.9, and 284.2 eV. The $sp^3$ content is calculated to be 42%.

Fabrication Example 2: Fabrication of Lithium Metal Electrode Consisting of Metal Lithium/Titanium/Titanium Nitride Using the same method as fabrication example 1, but with titanium metal as a target and nitrogen as a feed gas instead of methane gas, a titanium metal thin film and a titanium nitride ($TiN_x$) thin film are coated on a lithium metal substrate in order. On the other hand, the thickness of the titanium nitride ($TiN_x$) thin film in the structure is between 50 nm and 500 nm, and the thickness of the metal titanium thin film is between 25 nm and 95 nm.

The resistivity of the protection layer (Ti/$TiN_x$) is measured to be about $9.9\times10^{-5}$ Ωcm. Moreover, the composition structure is analyzed by identifying the bonding of titanium and nitrogen thereof with XPS. It is known from the analysis of the XPS energy spectrum that, the binding energy of the Ti $2p_{3/2}$ of the titanium nitride ($TiN_x$) thin film is 454.9 eV, which is close to the value of the TiN material (454.8 eV). The binding energy position of N 1s is 397.2 eV, which is the same as the binding energy position of nitride. Comparing the binding energy of each of Ti and N in the energy spectrum, the grown thin film is a $TiN_{0.98}$ thin film formed from the mutual bonding of Ti and N.

Fabrication Example 3: Fabrication of Lithium Metal Electrode Consisting of Metal Lithium/Titanium/Titanium Carbide Using the same method as fabrication example 1, but with titanium metal as a target, a titanium metal thin film and a titanium carbide thin film are coated on a lithium metal substrate in order. The thickness of the titanium carbide thin film in the structure is between 50 nm and 500 nm, and the thickness of the metal titanium thin film is between 25 nm and 95 nm.

The resistivity of the protection layer (titanium/titanium carbide) is measured to be $1.5\times10^{-4}$ Ωcm. Moreover, the composition structure is analyzed by identifying the bonding of carbon and titanium thereof with XPS. It is known from the analysis of the XPS energy spectrum that, the binding energy of Ti $2p_{3/2}$ of the titanium carbide thin film is 454.6 eV. The binding energy position of C 1s is 281.8 eV, which is the same as the binding energy position of carbide. Comparing the binding energy of each of Ti and C in the energy spectrum, the grown thin film is a $TiC_{0.95}$ thin film formed from the mutual bonding of Ti and C.

Fabrication Example 4: Fabrication of Lithium Metal Electrode Consisting of Metal Lithium/Titanium/Titanium Nitride The same method as fabrication example 2 is used, but the nitrogen flow is controlled to form titanium nitride ($TiN_x$) on the titanium metal thin film. The composition of titanium nitride ($TiN_x$) in the structure is 0.01<x<1.0, the thickness is between 100 nm and 180 nm, and the rest is the same as fabrication example 2. The resistivity of the protection layer (Ti/$TiN_x$) is measured to be about $6.1\times10^{-5}$ Ωcm.

Fabrication Example 5: Fabrication of Lithium Metal Electrode Consisting of Metal Lithium/Titanium/Titanium Carbide The same method as fabrication example 3 is used, but the methane flow is controlled to form titanium carbide ($TiC_x$) on the titanium metal thin film. The composition of titanium carbide ($TiC_x$) in the structure is 0.01<x<1.0, the thickness is between 100 nm and 180 nm, and the rest is the same as fabrication example 2. The resistivity of the protection layer (Ti/$TiC_x$) is measured to be about $1.8\times10^{-4}$ Ωcm.

Fabrication Example 6: Fabrication of Lithium Metal Electrode Consisting of Metal Lithium/Chromium/Chromium Nitride The same method as fabrication example 1 is used, but with chromium metal as a target and nitrogen as a feed gas instead of methane gas. Hence, a chromium metal thin film and a chromium nitride ($CrN_x$) thin film are coated on a lithium metal substrate in order. The composition of chromium nitride ($CrN_x$) in the structure is 0.01<x<1.0, the thickness of the chromium nitride thin film is between 50 nm and 500 nm, and the thickness of the chromium metal thin film is between 25 nm and 95 nm.

The resistivity of the protection layer (Cr/$CrN_x$) is measured to be $1.4\times10^{-4}$ Ω·cm. Moreover, the composition structure is analyzed by identifying the bonding of chromium and nitrogen thereof with XPS. It is known from the analysis of the XPS energy spectrum that, the binding energy of Cr $2p_{3/2}$ of the chromium nitride thin film is 574.9 eV. The binding energy position of N 1s is 397.1 eV, which is the same as the binding energy position of nitride. Comparing the binding energy of each of Cr and N in the energy spectrum, the grown thin film is a $CrN_{0.85}$ thin film formed from the mutual bonding of Cr and N.

Fabrication Example 7: Fabrication of Lithium Metal Electrode Consisting of Metal Lithium/Chromium/Chromium Carbide The same method as fabrication example 1 is used, but with chromium metal as a target, and a chromium metal thin film and a chromium carbide ($CrC_x$) thin film are coated on a lithium metal substrate in order. The composition of chromium carbide ($CrC_x$) in the structure is 0.01<x<1.0, the thickness of the chromium carbide thin film is between 50 nm and 500 nm, and the thickness of the chromium metal thin film is between 25 nm and 100 nm.

The resistivity of the protection layer (Cr/$CrC_x$) is measured to be $7.8\times10^{-4}$ Ω·cm. It is known from the analysis of the XPS energy spectrum that, the binding energy of Cr $2p_{3/2}$ of the chromium carbide thin film is 574.7 eV. The binding energy position of C 1s is 280.3 eV, which is the same as the binding energy position of carbide. Comparing the binding energy of each of Cr and C in the energy spectrum, the grown thin film is a $CrC_{0.37}$ thin film formed from the mutual bonding of Cr and C.

Fabrication Example 8: Fabrication of Lithium Metal Electrode Consisting of Metal Lithium/Niobium/niobium Nitride The same method as fabrication example 1, but with niobium metal as a target and nitrogen as a feed gas instead of methane gas, and a niobium metal thin film and a niobium nitride ($NbN_x$) thin film are coated on a lithium metal substrate in order. The composition of niobium nitride ($NbN_x$) in the structure is $0.01<x<1.0$, the thickness of the niobium nitride thin film is between 50 nm and 500 nm, and the thickness of the niobium metal thin film is between 25 nm and 95 nm.

The resistivity of the protection layer ($Nb/NbN_x$) is measured to be $4.8\times10^{-5}$ Ω·cm. Moreover, the composition structure is analyzed by identifying the bonding of niobium and nitrogen thereof with XPS. It is known from the analysis of the XPS energy spectrum that, the grown thin film is a niobium nitride ($NbN_x$) thin film formed from the mutual bonding of Nb and N.

Fabrication Example 9: Fabrication of Lithium Metal Electrode Consisting of Metal Lithium/Niobium/Niobium Carbide The same method as fabrication example 1 is used, but with niobium metal as a target, and a niobium metal thin film and a niobium carbide ($NbC_x$) thin film are coated on a lithium metal substrate in order. The composition of niobium carbide ($NbC_x$) in the structure is $0.01<x<1.0$, the thickness of the niobium carbide ($NbC_x$) thin film is between 50 nm and 500 nm, and the thickness of the niobium metal thin film is between 25 nm and 95 nm.

Moreover, the composition structure is analyzed by identifying the bonding of carbon and niobium thereof with XPS. It is known from the analysis of the XPS energy spectrum that, the grown thin film is a niobium carbide ($NbC_x$) thin film formed from the mutual bonding of Nb and C.

Fabrication Example 10: Fabrication of Lithium Metal Electrode Consisting of Metal Lithium/Tantalum/Tantalum Nitride The same method as fabrication example 1, but with tantalum metal as a target and nitrogen as a feed gas instead of methane gas, and a tantalum metal thin film and a tantalum nitride ($TaN_x$) thin film are coated on a lithium metal substrate in order. The composition of tantalum nitride ($TaN_x$) in the structure is $0.01<x<1.0$, the thickness of the tantalum nitride ($TaN_x$) thin film is between 50 nm and 500 nm, and the thickness of the tantalum metal thin film is between 25 nm and 95 nm.

The resistivity of the protection layer ($Ta/TaN_x$) is measured to be $2.7\times10^{-4}$ Ω·cm. Moreover, the composition structure is analyzed by identifying the bonding of tantalum and nitrogen thereof with XPS. It is known from the analysis of the XPS energy spectrum that, the grown thin film is a tantalum nitride ($TaN_x$) thin film formed from the mutual bonding of Ta and N.

Fabrication Example 11: Fabrication of Lithium Metal Electrode Consisting of Metal Lithium/Tantalum/Tantalum Carbide The same method as fabrication example 1 is used, but with tantalum metal as a target, and a tantalum metal thin film and a tantalum carbide ($TaC_x$) thin film are coated on a lithium metal substrate in order. The composition of tantalum carbide ($TaC_x$) in the structure is $0.01<x<1.0$, the thickness of the tantalum carbide ($TaC_x$) thin film is between 50 nm and 500 nm, and the thickness of the tantalum metal thin film is between 25 nm and 95 nm.

Moreover, the composition structure is analyzed by identifying the bonding of carbon and tantalum thereof with XPS. It is known from the analysis of the XPS energy spectrum that, the grown thin film is a tantalum carbide ($TaC_x$) thin film formed from the mutual bonding of Ta and C.

Fabrication Comparative Example 1

The surface of the lithium metal substrate is unprotected in any way.

Fabrication Comparative Example 2

Only a lithium nitride thin film is coated on the surface of the lithium metal substrate. The fabrication method of the lithium nitride thin film includes feeding a gas mixture (nitrogen and argon) of $2.8\times10^{-1}$ Pa to 3 Pa of into a vacuum chamber, with a processing temperature of 50° C. to 70° C., a substrate bias voltage of about 400V to 150V, and a processing time of 5 minutes to 20 minutes.

Experimental Example 1

The lithium metal electrode of each of fabrication example 4, fabrication comparative example 1, and fabrication comparative example 2 is each independently used as negative electrode, lithium cobalt oxides mixed with binders, and coated on aluminum foils are used as positive electrodes. The negative electrodes, positive electrodes, in conjunction with lithium ion-containing electrolyte solutions, are used to form device 1, comparative device 1, and comparative device 2.

The three devices are tested to obtain Table 1 below.

TABLE 1

| | Protection layer | Zp + Ze + Zn Total impedance (Ω) |
|---|---|---|
| Device 1 | titanium/$TiN_x$ | 50.3 |
| Comparative device 1 | — | 70.8 |
| Comparative device 2 | lithium nitride | 305 |

Zp: positive electrode impedance, Ze: electrolyte solution impedance, Zn: negative electrode impedance.

It is known from Table 1 that, the conventional method of using a nonconductive lithium nitride to protect the lithium electrode causes a significant increase in impedance. Device 1 of the disclosure has a lower impedance performance compared to the unprotected lithium electrode in terms of impedance.

Experimental Example 2

The initial capacity and total impedance of each of device 1 and comparative device 1 of experimental example 1 is measured and recorded in Table 2 below.

Moreover, device 1 and comparative device 1 are formed with the same method as experimental example 1, but the following deterioration test is performed on the lithium negative electrodes thereof before the formation of device 1 and comparative device 1.

Deterioration test: a plurality of lithium electrodes are exposed to an atmospheric environment at 25° C. and 70% RH for 3 minutes.

Then, the initial capacity and total impedance of each of device 1 and comparative device 1 having lithium negative electrodes after the deterioration test are measured. The results are similarly recorded in Table 2 below.

TABLE 2

|  | Protection layer | Deterioration test | Zp + Ze + Zn Total impedance (Ω) | Initial capacity (mAh/g) |
|---|---|---|---|---|
| Comparative device 1 | — | No | 70.8 | 144.7 |
| Comparative device 1 | — | Yes | 999.6 | 96.4 |
| Device 1 | titanium/TiN$_x$ | No | 50.3 | 146.6 |
| Device 1 | titanium/TiN$_x$ | Yes | 190 | 139.1 |

It is known from Table 2 that, the total impedance of the unprotected lithium electrode is significantly increased after the deterioration test, and the active capacity thereof is significantly decreased. Regarding the design that uses the protected lithium metal electrode of fabrication example 4 as an negative electrode, the degree to which the impedance thereof increases is still far less than that of an unprotected lithium electrode even after the deterioration test, and the magnitude of loss of the active capacity thereof is small.

Experimental Example 3

Figure 5:
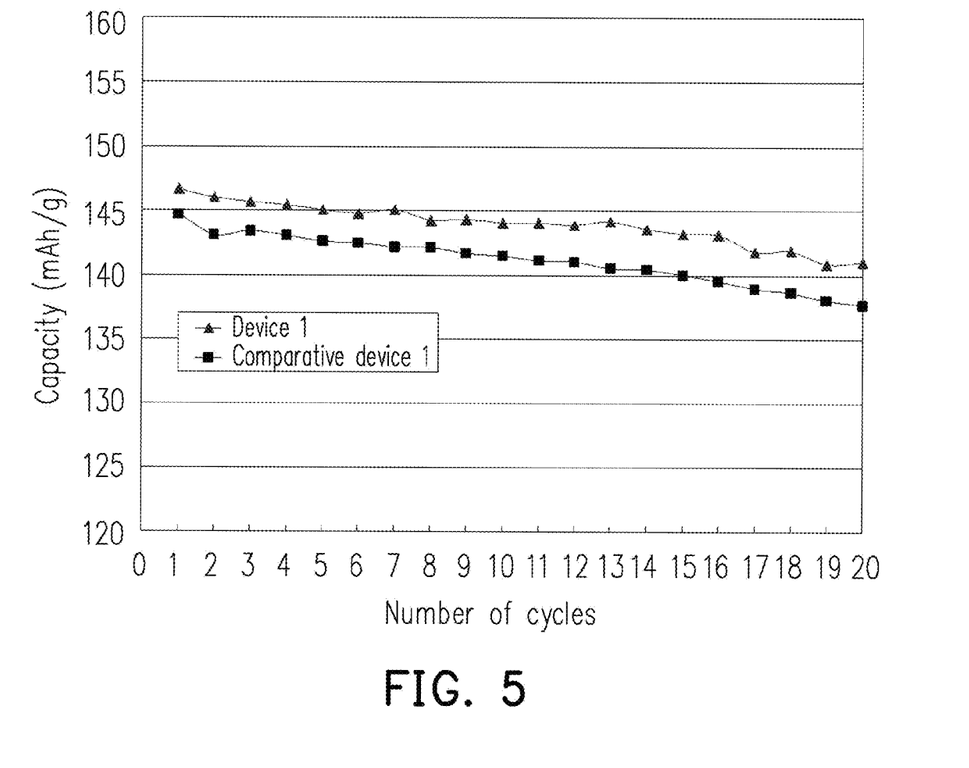
FIG. 5 is a diagram of the relationship between number of cycles and capacity of experimental example 3.

Device 1, comparative device 1, and comparative device 2 are formed by using the same method as experimental example 1. Then, 20 charge-discharge cycles are performed on device 1, comparative device 1, and comparative device 2. The relationship between number of cycles and capacity of each thereof is shown in FIG. 5, and the initial capacity and capacity after 20 cycles of each thereof are recorded in Table 3 below.

Experimental Example 4

The lithium metal electrode of fabrication example 2 is used as negative electrode, lithium cobalt oxide mixed with binder, and coated on aluminum foil is used as positive electrode. The negative electrode and positive electrode in conjunction with a lithium ion-containing electrolyte solution, are used to form device 2. Then, 20 charge-discharge cycles are performed on device 2, and the capacity of each of the initial device 2 and the device 2 after 20 cycles is recorded in Table 3 below.

Experimental Example 5

The lithium metal electrode of fabrication example 3 is used as negative electrode, lithium cobalt oxide mixed with binder, and coated on aluminum foil is used as positive electrode. The negative electrode and positive electrode in conjunction with a lithium ion-containing electrolyte solution, are used to form device 3. Then, 20 charge-discharge cycles are performed on device 3, and the capacity of each of the initial device 3 and the device 3 after 20 cycles is recorded in Table 3 below.

Experimental Example 6

The lithium metal electrode of fabrication example 5 is used as negative electrode, lithium cobalt oxide mixed with binder, and coated on aluminum foil is used as positive electrode. The negative electrode and positive electrode, in conjunction with a lithium ion-containing electrolyte solution, are used to form device 4. Then, 20 charge-discharge cycles are performed on device 4, and the capacity of each of the initial device 4 and the device 4 after 20 cycles is recorded in Table 3 below.

Experimental Example 7

The lithium metal electrode of fabrication example 6 is used as negative electrode, lithium cobalt oxide mixed with binder, and coated on aluminum foil is used as positive electrode. The negative electrode and positive electrode in conjunction with a lithium ion-containing electrolyte solution, are used to form device 5. Then, 20 charge-discharge cycles are performed on device 5, and the capacity of each of the initial device 5 and the device 5 after 20 cycles is recorded in Table 3 below.

Experimental Example 8

The lithium metal electrode of fabrication example 7 is used as negative electrode, lithium cobalt oxide mixed with binder, and coated on aluminum foil is used as positive electrode. The negative electrode and positive electrode in conjunction with a lithium ion-containing electrolyte solution, are used to form device 6. Then, 20 charge-discharge cycles are performed on device 6, and the capacity of each of the initial device 6 and the device 6 after 20 cycles is recorded in Table 3 below.

Experimental Example 9

The lithium metal electrode of fabrication example 8 is used as negative electrode, lithium cobalt oxide mixed with binder, and coated on aluminum foil is used as positive electrode. The negative electrode and positive electrode in conjunction with a lithium ion-containing electrolyte solution, are used to form device 7. Then, 20 charge-discharge cycles are performed on device 7, and the capacity of each of the initial device 7 and the device 7 after 20 cycles is recorded in Table 3 below.

Experimental Example 10

The lithium metal electrode of fabrication example 9 is used as negative electrode, lithium cobalt oxide mixed with binder, and coated on aluminum foil is used as positive electrode. The negative electrode and positive electrode in conjunction with a lithium ion-containing electrolyte solution, are used to form device 8. Then, 20 charge-discharge cycles are performed on device 8, and the capacity of each of the initial device 8 and the device 8 after 20 cycles is recorded in Table 3 below.

Experimental Example 11

The lithium metal electrode of fabrication example 10 is used as negative electrode, lithium cobalt oxide mixed with binder, and coated on aluminum foil is used as positive electrode. The negative electrode and positive electrode in conjunction with a lithium ion-containing electrolyte solution, are used to form device 9. Then, 20 charge-discharge cycles are performed on device 9, and the capacity of each of the initial device 9 and the device 9 after 20 cycles is recorded in Table 3 below.

Experimental Example 12

The lithium metal electrode of fabrication example 11 is used as negative electrode, lithium cobalt oxide mixed with binder, and coated on aluminum foil is used as positive electrode. The negative electrode and positive electrode in conjunction with a lithium ion-containing electrolyte solution, are used to form device 10. Then, 20 charge-discharge cycles are performed on device 10, and the capacity of each of the initial device 10 and the device 10 after 20 cycles is recorded in Table 3 below.

TABLE 3

|  | Protection layer | Initial capacity (mAh/g) | Capacity after 20 cycles (mAh/g) |
|---|---|---|---|
| Comparative device 1 | — | 144.7 | 137.7 |
| Comparative device 2 | lithium nitride | 134.2 | 124.4 |
| Device 1 | titanium/$TiN_x$ | 146.6 | 141.0 |
| Device 2 | titanium/$TiN_x$ | 145.1 | 139.4 |
| Device 3 | titanium/$TiC_x$ | 143.3 | 138.0 |
| Device 4 | titanium/$TiC_x$ | 145.4 | 140.4 |
| Device 5 | chromium/$CrN_x$ | 145.3 | 139.1 |
| Device 6 | chromium/$CrC_x$ | 145.4 | 141.5 |
| Device 7 | Niobium/$NbN_x$ | 145.9 | 140.4 |
| Device 8 | Niobium/$NbC_x$ | 147.8 | 142.8 |
| Device 9 | Tantalum/$TaN_x$ | 145.3 | 137.6 |
| Device 10 | Tantalum/$TaC_x$ | 149.4 | 146.2 |

It is known from Table 3 that, device 1 of the disclosure has a higher capacity performance.

Figure 6A:
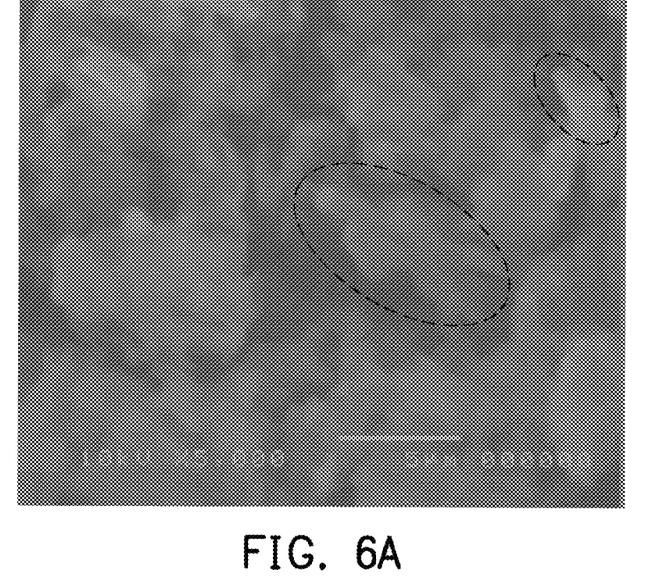
FIG. 6A is an SEM image of comparative device 1 of experimental example 3 after 20 cycles.
Figure 6B:
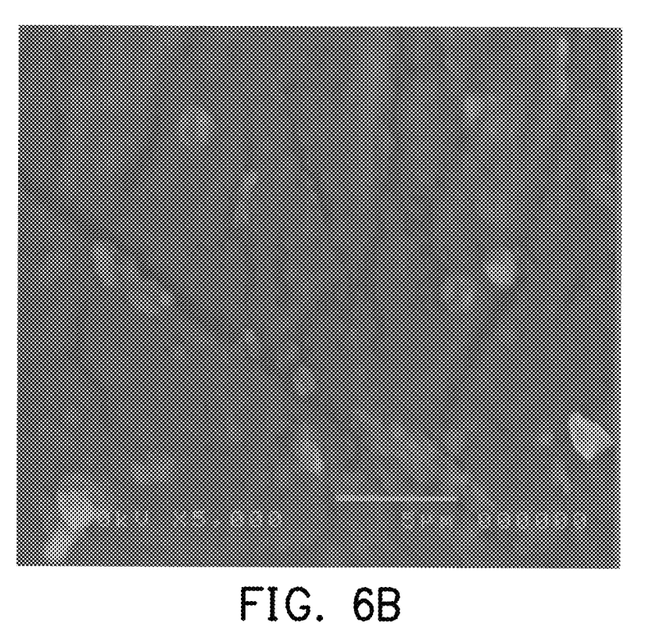
FIG. 6B is an SEM image of device 1 of experimental example 3 after 20 cycles.

Then, SEM is used to individually observe the surface of the lithium negative electrode of each of comparative device 1 and device 1 after 20 cycles. The results are shown in FIG. 6A and FIG. 6B. FIG. 6A is an unprotected lithium electrode, and it is apparent that cavities are produced irregularly throughout the surface thereof. Dendritic deposits are also present (please refer to the area circled by a dashed line), wherein the dendritic deposits pose a safety concern as they may cause a short circuit in the device by puncturing the separator. On the other hand, FIG. 6B is the surface of the lithium electrode of device 1 of the disclosure, and although fragmentation is present, the surface appears to be more smooth without the generation of dendritic deposits.

Figure 7:
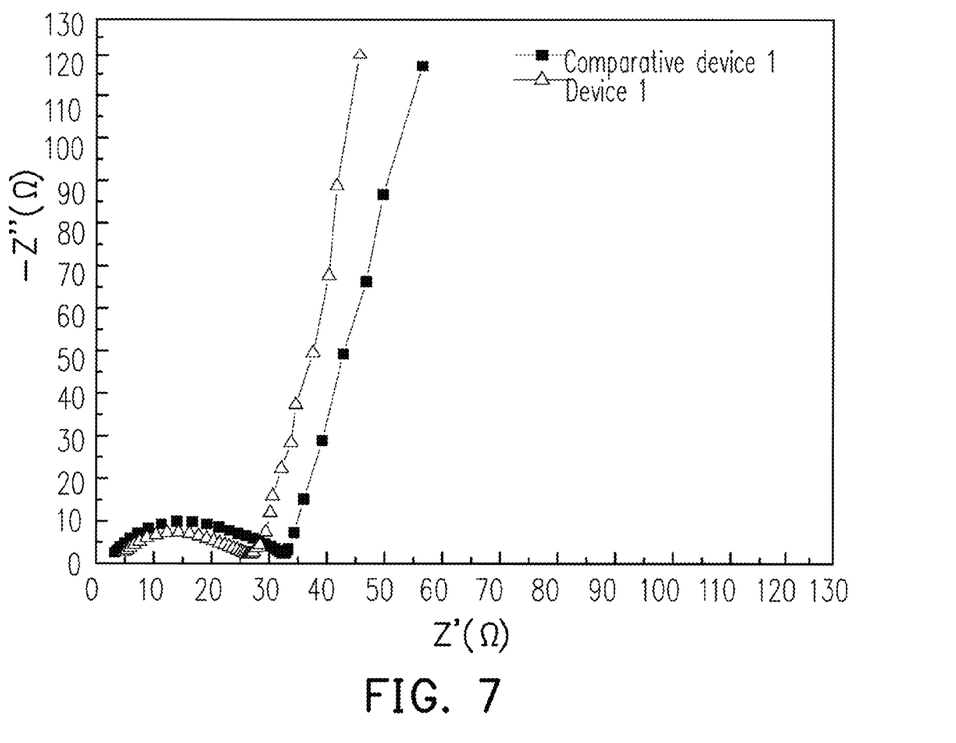
FIG. 7 is a Nyquist diagram of the impedance of each of comparative device 1 and device 1 of experimental example 3 after 20 cycles.

On the other hand, the total impedance performance of each of the comparative device 1 and device 1 after 20 cycles is measured and shown in FIG. 7, wherein −Z" is the imaginary number portion of the Nyquist diagram, and Z' is the real part of the Nyquist diagram. It is known from FIG. 7 that, device 1 of the disclosure may have a lower total impedance performance after 20 cycles.

Experimental Example 13

The lithium metal electrode of each of fabrication comparative example 1, fabrication example 1, fabrication example 4, fabrication example 8, fabrication example 7, and fabrication example 3 is each independently used as a negative electrode. Sulfur/carbon composites, conductive agent, and binders are on aluminum foils as positive electrodes. The negative electrodes, positive electrodes in conjunction with lithium ion-containing electrolyte solutions, are used to form comparative device 3, device 11, device 12, device 13, device 14, and device 15.

The initial capacity of each of the six devices is tested, and then 10 charge-discharge cycles are performed thereon. The initial capacity and capacity after 20 cycles of each thereof are recorded in Table 4 below.

TABLE 4

|  | Protection layer | Initial capacity (mAh/g) | Capacity after 10 cycles (mAh/g) |
|---|---|---|---|
| Comparative device 3 | — | 131.2 | 111.9 |
| Device 11 | titanium/$TiC_x$/DLC | 144.5 | 122.5 |
| Device 12 | titanium/$TiN_x$ | 142.5 | 121.5 |
| Device 13 | Niobium/$NbN_x$ | 149.1 | 119.6 |
| Device 14 | chromium/$CrC_x$ | 142.3 | 111.9 |
| Device 15 | titanium/$TiC_x$ | 151.6 | 117.5 |

It is known from Table 4 that, in comparison with the unprotected lithium electrode, devices 11-15 of the disclosure have high capacity performance.

Based on the above, in the disclosure, a protection layer composed of a specified metal thin film and an electrically-conductive thin film is formed on a surface of a lithium metal, so that a lower impedance performance than the unprotected lithium electrode is thus obtained, and at the same time the adhesion of the protection layer is improved. Moreover, when the lithium metal electrode of the disclosure is applied in a device, not only is high capacity maintained, reaction between the lithium metal electrode and the ingredients contained in the electrolyte solution is avoided, and therefore the electrochemical cycling ability of the lithium metal electrode is unaffected. Furthermore, the production of deterioration phenomenon due to changes in surface morphology of the lithium metal during charge-discharge cycles may be effectively avoided.

It is known from the disclosed embodiments that use lithium metal substrates that the protection layer structure of the disclosure, on the whole, not only has a low impedance characteristic, but may also prevent deterioration of the lithium electrode compared to the conventional protection layer design, so that the device may maintain a more stable high capacity. The design concept of the protection layer of the disclosure may also be used in a protection layer composed of an active metal such as sodium, magnesium, calcium, or aluminum.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A protected lithium metal electrode, comprising:
   a lithium metal substrate; and
   a protection layer, located on a surface of the lithium metal substrate, wherein the protection layer comprises:
   a metal thin film, covering the surface of the lithium metal substrate, wherein the metal thin film consists of a metal selected from the group consisting of Ti, V, Cr, Zr, Nb, Mo, Hf, Ta, and W; and
   an electrically-conductive thin film, covering a surface of the metal thin film, wherein a material of the electrically-conductive thin film is selected from one of nitride of a metal in the metal thin film, carbide of a metal in the metal thin film, a diamond-like carbon (DLC), and a combination thereof.

2. The protected lithium metal electrode of claim 1, wherein a thickness of the metal thin film is between 10 nm and 100 nm.

3. The protected lithium metal electrode of claim 1, wherein a resistivity of the electrically-conductive thin film is between $10^{-5}$ Ω·cm and $10^2$ Ω·cm.

4. The protected lithium metal electrode of claim 1, wherein a thickness of the electrically-conductive thin film is between 10 nm and 1000 nm.

5. The protected lithium metal electrode of claim 1, wherein the DLC has a tetrahedral amorphous carbon (ta-C) structure, and a $sp^3$ content>40%.

6. The protected lithium metal electrode of claim 1, wherein a material of the electrically-conductive thin film comprises $TiN_x$, $CrN_x$, $TaN_x$, or $NbN_x$, and 0.01<x<1.0.

7. The protected lithium metal electrode of claim 1, wherein a material of the electrically-conductive thin film comprises $TiC_x$, $CrC_x$, $TaC_x$, or $NbC_x$, and 0.01<x<1.0.

8. A device with a protected active metal electrode, comprising:
  a positive electrode, having electrochemical activity;
  an active metal negative electrode, comprising:
    an active metal substrate, wherein the active metal substrate consists of a material selected from the group consisting of lithium, sodium, magnesium, calcium, aluminum, and a combination thereof; and
    a protection layer, located on a surface of the active metal substrate, wherein the protection layer comprises:
    a metal thin film, covering the surface of the active metal substrate, wherein the metal thin film consists of a metal selected from the group consisting of Ti, V, Cr, Zr, Nb, Mo, Hf, Ta, and W; and
    an electrically-conductive thin film, covering a surface of the metal thin film, wherein a material of the electrically-conductive thin film is selected from one of nitride of a metal in the metal thin film, carbide of a metal in the metal thin film, a DLC, and a combination thereof; and
  an electrolyte, in contact with the positive electrode and the active metal negative electrode to provide active metal ions for conduction.

9. The device with the protected active metal electrode of claim 8, wherein a thickness of the metal thin film of the active metal negative electrode is between 10 nm and 100 nm.

10. The device with the protected active metal electrode of claim 8, wherein a resistivity of the electrically-conductive thin film of the active metal negative electrode is between $10^{-5}$ Ω·cm and $10^2$ Ω·cm.

11. The device with the protected active metal electrode of claim 8, wherein a thickness of the electrically-conductive thin film of the active metal negative electrode is between 10 nm and 1000 nm.

12. The device with the protected active metal electrode of claim 8, wherein the DLC has a tetrahedral amorphous carbon (ta-C) structure, and a $sp^3$ content>40%.

13. The device with the protected active metal electrode of claim 8, wherein the material of the electrically-conductive thin film of the active metal negative electrode comprises $TiN_x$, $CrN_x$, $TaN_x$, or $NbN_x$, and 0.01<x<1.0.

14. The device with the protected active metal electrode of claim 8, wherein the material of the electrically-conductive thin film of the active metal negative electrode comprises $TiC_x$, $CrC_x$, $TaC_x$, or $NbC_x$, and 0.01<x<1.0.

15. The device with the protected active metal electrode of claim 8, wherein the positive electrode is a material selected from the group consisting of a sulfur-containing material, metal oxide, a carbon material, and a combination thereof.

16. The device with the protected active metal electrode of claim 15, wherein the sulfur-containing material is a material selected from the group consisting of sulfur, metal sulfide, organic sulfur, and a combination thereof.

17. The device with the protected active metal electrode of claim 15, wherein the carbon material is a material selected from the group consisting of activated carbon, carbon black, graphite, carbon fiber, carbon nanotube, mesoporous carbon, graphene, and a combination thereof.

18. The device with the protected active metal electrode of claim 15, wherein the metal oxide comprises lithium-containing metal oxide or lithium-free metal oxide.

19. The device with the protected active metal electrode of claim 18, wherein the lithium-containing oxide is an oxide selected from the group consisting of lithium cobalt oxide, lithium nickel oxide, lithium manganese oxide, lithium nickel manganese oxide, lithium nickel cobalt oxide, lithium cobalt manganese oxide, lithium nickel cobalt manganese oxide, lithium iron oxide, lithium cobalt phosphorous oxide, lithium nickel phosphorous oxide, lithium iron phosphorous oxide, lithium manganese phosphorous oxide, lithium cobalt manganese phosphorous oxide, lithium nickel cobalt phosphorous oxide, lithium iron cobalt phosphorous oxide, lithium iron nickel phosphorous oxide, lithium iron manganese phosphorous oxide, lithium iron silicon oxide, lithium iron boron oxide, lithium titanium oxide, lithium cobalt titanium oxide, lithium manganese titanium oxide, lithium iron titanium oxide, lithium titanium phosphorous oxide, lithium vanadium oxide, lithium vanadium phosphorous oxide, and a combination thereof; and the lithium-free oxide is selected from the group consisting of vanadium oxide, manganese oxide, tungsten oxide, titanium oxide, chromium oxide, iron oxide, cobalt oxide, nickel oxide, niobium oxide, molybdenum oxide, tin oxide, sodium vanadium oxide, sodium manganese oxide, sodium titanium oxide, sodium chromium oxide, sodium iron oxide, sodium cobalt oxide, sodium nickel manganese oxide, sodium nickel cobalt oxide, sodium cobalt manganese oxide, sodium nickel cobalt manganese oxide, sodium cobalt phosphorous oxide, sodium nickel phosphorous oxide, sodium iron phosphorous oxide, sodium manganese phosphorous oxide, sodium iron manganese phosphorous oxide, sodium vanadium phosphorous oxide, sodium titanium phosphorous oxide, and a combination thereof.

20. The device with the protected active metal electrode of claim 8, wherein the electrolyte is a solid electrolyte, molten salt, an ionic liquid, a gel electrolyte, or an electrolyte solution.

21. A protected active metal electrode, comprising:
  an active metal substrate, wherein the active metal substrate consists of a material selected from the group consisting of lithium, sodium, magnesium, calcium, aluminum, and a combination thereof; and
  a protection layer, located on a surface of the active metal substrate, wherein the protection layer comprises:
  a metal thin film, covering the surface of the active metal substrate, wherein the metal thin film consists of a metal selected from the group consisting of Ti, V, Cr, Zr, Nb, Mo, Hf, Ta, and W; and
  an electrically-conductive thin film, covering a surface of the metal thin film, wherein a material of the electrically-conductive thin film is selected from nitride of a metal in the metal thin film, carbide of a metal in the metal thin film, a diamond-like carbon (DLC), and a combination thereof.

* * * * *